United States Patent Office 2,717,882
Patented Sept. 13, 1955

2,717,882

PROCESS FOR POLYMERIZING BLOWN FATTY OILS OR MATERIALS CONTAINING BLOWN FATTY OIL ACID RADICALS

Myron W. Kiebler, Jr., Cleveland, Albert Zier, Vermillion, and Everett B. Euchner, Avon Lake, Ohio, assignors to The Glidden Company, Cleveland, Ohio, a corporation of Ohio No Drawing. Application October 26, 1951,
Serial No. 253,463

22 Claims. (Cl. 260—22)

This invention relates to the catalytic polymerization of materials composed of or containing blown fatty-oil-acid radicals and derivatives thereof to yield products which are valuable and useful in industry.

The catalytic polymerization of blown oils by treatment of the oils with boron trifluoride is known in the art, such treatment being described and claimed in the United States patent of Konen and Clocker, No. 2,547,760, issued April 3, 1951. Boron trifluoride is a recognized Friedel-Crafts type catalyst, and many literature references and patents describe the use of this compound as a polymerization catalyst for various organic structures. The ability of boron trifluoride to form organic complexes and addition products is also well known, and certain of these complexes are items of commerce.

We have discovered the unobvious and completely unexpected fact that an aqueous solution of fluoboric acid is a superior catalyst for the polymerization of materials containing a blown fatty acid radical. The results are even more surprising when it is considered that the catalyst or catalyst solution used may contain more than 30% water. The uniqueness of the processes which we claim may be shown by the following experiments. If a small amount of boron trifluoride is added to an organic solution of oiticica oil, gelation takes place at the point of contact of the oil and catalyst. If a 42–43% aqueous solution of fluoboric acid is added to an identical solution of oil, the acid solution merely settles to the bottom, resembling the results obtained when water is added to oil. There is no evidence of polymerization or reaction, and even when large amounts of the acid are added, no effect can be detected. Addition of an organic solvent, such as methoxy ethanol, for the aqueous solution of the fluoboric acid does not bring about polymerization. If a 70% solution of linseed oil in mineral spirits is treated with 0.15% of a commercial aqueous solution of 42.57% fluoboric acid diluted with an equal weight of methoxy ethanol, no change in viscosity can be detected after 24 hours at room temperature. These results would be more or less expected. However, when a 70% mineral spirits solution of linseed oil which had been blown to a Z body was treated with the same amounts of catalyst under the same conditions, the viscosity of the oil solution increased from an initial value of E–F on the Gardner-Holdt scale to a value of U in 8 hours and to a value of $Z_1$–$Z_2$ in 24 hours. These experiments and others to be described later clearly indicate that fluoboric acid is a specific catalyst for blown fatty oil radicals. This invention is in no way to be limited to the use of any certain type of oil, and it will be shown that the process works equally well with blown semi-drying oil, blown drying oils, blown conjugated oils, blown non-drying oils, blown oil-modified or fatty-acid modified alkyds and blown fatty acids. In fact, the process has worked in every case where a blown fatty oil acid or a derivative thereof was involved.

Accordingly, the primary object of the invention is to provide a process for the catalytic polymerization of materials composed of blown fatty oils or the blown acids thereof, or containing blown fatty-oil-acid radicals, by employing polar fluoboric acid solutions as the catalyst.

Other objects ancillary thereto will be apparent from the following description of the invention.

Fluoboric acid in the anhydrous state is said to be unknown ("Inorganic Chemistry" by Fritz Ephraim, 3rd ed., p. 771; Nordeman Publ. Co., N. Y.). However, fluoboric acid in aqueous solution is a present-day commercial product, and is readily available as a reagent in moderately pure form. Fluoboric acid solutions in organic solvents may also be prepared from boron trifluoride and hydrofluoric acid by known methods.

In the use of gaseous boron trifluoride as a catalyst, various handling difficulties are encountered, and in treatments such as are involved in the present invention, the introduction of the gaseous catalyst into the blown materials so as to provide a uniform distribution therethrough, entails time-consuming operations and elaborate equipment which add to the treating costs. Such difficulties and expense are avoided by the use of fluoboric acid solutions as the catalyst. Moreover, fluoboric acid is sufficiently active as a catalyst as to permit lower temperatures to be used, and for most work makes it possible to carry out the polymerizations at normal room temperatures, thereby avoiding the expense of heating the material during the treatment. In fact, the reactions promoted by the catalyst are appreciably exothermic, and may even cause more heating of the material under treatment than is desired. In such instances, the reaction is desirably carried out in kettles or tanks equipped with cooling coils or jackets. There is no intention to imply here that the process is limited to lower temperatures; in fact, in some instances there are definite advantages in using higher temperatures. For example, oils are often blown at 180 to 250° F., and it may be convenient to add the catalyst to the oil at the end of the blowing cycle and while the oil is still in the original equipment. The blown oil can then be polymerized at 100% non-volatile content or it may be first thinned with a solvent as disclosed later. Conducting the process above room temperature and/or in the presence of a solvent reduces the viscosity of the oil mass and facilitates agitation. Such variables are at the choice of the operator and depend on economic factors and equipment and are within the overall scope of the invention.

Water and various organic polar diluents (e. g. methoxy ethanol) inhibit the catalytic action and should not be present in the batch in more than small percentages by weight of the batch when maximum catalyst activity is desired.

In carrying out the polymerizations, we prefer to treat the blown materials in the form of organic-solvent solutions in which the concentration promotes nearly optimum solvent tolerance, as is illustrated in Example VII hereinafter. However, if solvent tolerance is of little concern, then the blown materials may be polymerized either in the absence of organic solvent or at any desired concentration in solvent. There are mechanical advantages in conducting the process with a solution of the blown material, since if the polymerized product has a high viscosity, handling will be facilitated by the presence of a solvent.

The blown oils treated in accordance with this invention are especially useful in paints, enamels and other coating compositions, since it has been found that they exhibit non-penetrating qualities which confer good "holdout" to coatings applied to porous surfaces. The product prepared by polymerizing blown castor oil (which is a non-drying oil) is compatible with typical nitrocellulose formulations and is of value in lacquers where the polymerized blown product functions as a plasticizer. Depending on the nature of the starting material, such possible properties as improved drying characteristics, high viscosity, compatibility, stability, holdout, etc., will suggest many other possible applications to one skilled in the art.

The following examples illustrate the principles of the invention.

EXAMPLE I

| | |
|---|---|
| Blown linseed oil | 1000 grams. |
| Mineral spirits | 430 grams. |
| Aqueous HBF$_4$ solution | 2.33 grams, dissolved in 5 grams of methoxy ethanol. |

The oil and mineral spirits were mixed together giving a solution containing 70% oil. The fluoboric acid solution was slowly added to this mixture at room temperature, and the reaction mixture was stirred constantly without adding heat while periodic samples were taken. The fluoboric acid catalyst used was a 42.9% solution of HBF$_4$ in water and contained 0.2% boric acid. The amount therefore corresponds to 0.1% of anhydrous HBF$_4$ based on the oil in the formula. In 1 hour and 35 minutes, the viscosity of the batch increased from a Gardner-Holdt value of G to a value of Z. The polymerization was stopped at this point by adding 0.638 gram of C. P. grade potassium hydroxide dissolved in a little alcohol. It should be noted that the reaction is exothermic.

EXAMPLE II

| | |
|---|---|
| Blown linseed oil | 9080 grams. |
| Mineral spirits | 3891 grams. |
| Aqueous HBF$_4$ solution | 21.6 grams, dissolved in 21.6 grams of methoxy ethanol. |
| Potassium hydroxide | 6.35 grams, dissolved in 16.60 grams of methyl alcohol. |

The fluoboric acid, as a 42–43% solution, corresponds to 0.1% of anhydrous HBF$_4$ based on the oil. The procedure outlined in Example I was followed and a viscosity increase from G to Z$_1$ was obtained in 1 hour and 5 minutes at 80–95° F.

EXAMPLE III

| | |
|---|---|
| Blown linseed oil | 1000 grams. |
| Mineral spirits | 430 grams. |
| Aqueous HBF$_4$ solution | 1.17 grams, dissolved in 1.17 grams of methoxy ethanol, corresponding to 0.05% active fluoboric acid based on the oil. |
| Potassium hydroxide | 0.342 gram, dissolved in 1.37 grams of methyl alcohol. |

The oil solution went from a G to a Y viscosity in 7½ hours at 75–105° F.

EXAMPLE IV

| | |
|---|---|
| Blown soybean oil | 3750 grams, Z$_3$ viscosity. |
| Mineral spirits | 1610 grams. |
| Aqueous HBF$_4$ solution | 3.75 grams, dissolved in 30.0 grams of methoxy ethanol, corresponding to 0.043% of active fluoboric acid based on the oil. Catalyst contained 0.2% boric acid. |
| Potassium hydroxide | 1.13 grams, dissolved in 4.62 grams of methyl alcohol. |

Procedure outlined above in Example I was followed, and the oil went from a G to an X–Y viscosity in 3 hours 25 minutes at 76–88° F.

EXAMPLE V

| | |
|---|---|
| Blown soybean oil | 3750 grams. |
| Mineral spirits | 1610 grams. |
| Aqueous HBF$_4$ solution | 3.75 grams, dissolved in 3.75 grams of methoxy ethanol. Catalyst contained .2% boric acid. |
| Potassium hydroxide | 1.13 grams, dissolved in 4.62 grams methyl alcohol. |

The viscosity increased from G to Z in 25 minutes at 75–87° F.

By comparison of the rates of polymerization observed in Examples IV and V, it will be seen that the additional 26+ grams of the polar diluent methoxy ethanol in Example IV retarded the polymerization rate. This retardation can be overcome by increasing the amount of catalyst. The rates of reaction may also be increased by carrying out the treatments at higher temperatures, as shown by the following example:

EXAMPLE VI

A 70% solution of blown linseed in mineral spirits was treated with .15% of a commercial aqueous solution of fluoboric acid containing 43% of active material in water (giving .0644% HBF$_4$ on the oil), and the viscosity increased from G to U in two hours at 74°–79° F. In a duplicate treatment of the same oil, the viscosity went from G to Z— in 80 minutes when started at 78° F. and held for 65 of the 80 minutes at 125° F.

EXAMPLE VII

Blown linseed oil having a viscosity of Z$_3$ was polymerized (A) in the absence of solvent and then reduced with mineral spirits to 70% NVM; (B) at 85% NVM in mineral spirits and then reduced to 70% NVM; (C) at 70% NVM in mineral spirits; and (D) at 50% NVM in mineral spirits, all samples being treated in a similar fashion and at essentially the same catalyst concentration based on the weight of oil present. The tolerance of the different batches for kerosene is shown in the table.

*Table I*

| Batch | Kerosene tolerance |
|---|---|
| A | Reduction from 1 to 1.1. |
| B | Reduction from 1 to 1.3. |
| C | Reduction from 1 to 1.5. |
| D | Reduction from 1 to 1.2. |

While solvent tolerance is affected by the polymerization treatment, as shown above, we have also discovered that it is related to the viscosity of the starting oil. Thus a heavy bodied raw linseed oil (a raw oil which has been blown) having a viscosity of Y to Z, will, when polymerized identically with batch C of Table I, tolerate the addition of 2.6 parts of kerosene per part of oil.

The foregoing examples illustrate polymerization of oils in mineral spirits, but it should be understood that various other solvents may be used instead, e. g. toluene, kerosene.

EXAMPLE VIII

A sample of blown castor oil having a viscosity of Z$_6$+3 bubbles was reduced to 70% solids with toluene to give a solution having a viscosity of T–U. 1.4 grams of a 43% aqueous solution of fluoboric acid diluted with 4.2 grams of methoxy ethanol was added to the solution at 75° F. After two hours, the viscosity had reached a value of Z$_2$ at which point alkali inhibitor was added to deactivate the catalyst. The product was compatible with a nitrocellulose lacquer formulation containing a typical resin such as dammar.

EXAMPLE IX

A sample of soya fatty acids having a viscosity lower than A was blown with air at 225° F. until a final viscosity of S was reached. Seven hundred grams of this blown material was treated at 70% solids in mineral spirits with 2.8 grams of an aqueous 43% solution of fluoboric acid, diluted with 8.4 grams of methoxy ethanol. The original viscosity of the solution of blown material was less than A, and the initial temperature was 78°. After addition of the catalyst, the temperature increased to 98° F. A final viscosity of D was reached after about 6 hours.

EXAMPLE X

A long oil, linseed alkyd having an original viscosity less than C when thinned to 80% solids with toluene was blown with air at a temperature of 200-210° F. until the viscosity reached U–V at 80% solids in toluene. On standing the 80% alkyd solution further polymerized to a viscosity of W–X. A 500-gram sample of the toluene alkyd solution (80% solid material) was treated with 0.6 gram of 43% aqueous fluoboric acid solution diluted with 0.6 gram of methoxy ethanol, at an initial temperature of 83° F. In one hour and fifteen minutes, the viscosity reached a value of $Z_4$–$Z_5$ at which point the process was stopped by adding a mixture of 0.181 gram of C. P. potassium hydroxide and 0.740 gram of methyl alcohol.

Conventional amounts of lead, cobalt and manganese drier were added to samples of the blown alkyd, the polymerized blown alkyd, and an alkyd of the same composition as that used in this example but which had not been blown. After suitable amounts of solvent were added, the alkyd solutions were poured out on glass panels. The polymerized blown alkyd film was set-to-touch before the other two films and showed better initial through dry. While the alkyd film and the blown alkyd film showed wrinkling, the film from the polymerized blown alkyd was smooth.

EXAMPLE XI

A quantity of tung oil having an initial viscosity of J was blown with air at 200° F. until a final value of X was obtained. 637 grams of the product was diluted to 90% solids with mineral spirits and treated with 3.2 grams of 43% aqueous fluoboric acid diluted with 9.6 grams of methoxy ethanol at 85° F. The initial oil solution had a viscosity of S, and after 1.5 hours, a body of $Z_6$ was reached.

EXAMPLE XII

When a 70% solution of a blown linseed oil in mineral spirits was treated with 0.15% of a 43% aqueous solution of fluoboric acid diluted with an equal weight of methoxy ethanol, the solution increased in viscosity from G to W–X in 2 hours. When 5% of water was added to the oil and the same amount of catalyst and solvent was added, the solution showed no viscosity change after 3 hours. This example clearly shows the effect of excess water on the reaction.

It will be understood that any of the unsaturated fatty oils or unsaturated fatty oil acids, or materials containing same, may be blown and then polymerized by treatment with fluoboric acid solutions in the manners described above. It should also be understood that mixtures of such oils or oil acids may also be polymerized in some instances to obtain properties which are desirable. For instance, a mixture of 75% blown linseed oil and 25% blown soya oil when polymerized with aqueous fluoboric acid yielded a product which dried much faster than polymerized blown soya, and dried almost as fast as polymerized blown linseed. In fact, during the early stages of dry, the product obtained by polymerizing blown soya oil and blown linseed oil together dried better than the product obtained by blending 75% polymerized blown linseed oil and 25% polymerized blown soya oil. Various other combinations of the oils will be obvious to yield products having valuable properties as well as economic advantages.

It will be noted in the above examples that the catalyst solution is diluted with various amounts of an organic solvent. The diluting solvent is not limited to the use of methoxy ethanol, since any other compatible solvents may be used. In fact, it is not even necessary to use a solvent, but there are often advantages. For example in laboratory experiments the use of a small amount of a reagent is often simplified by diluting the reagent with an inactive material. Also, some blown oils are more reactive than others, and the addition of undiluted catalyst solution may produce small gel particles which become distributed through the oil. This gel formation can be prevented by selecting a suitable type and amount of diluent.

Because of the variation in reactivity found with different oils and acid radicals, and with different extents of blowing, it may be necessary to determine the most desirable temperature and catalyst concentration by trial, but the above examples clearly illustrate the general nature of the results to be expected. At the same catalyst concentration and using blown oils of the same initial viscosity, it has been found that blown soya oil is polymerized faster than blown linseed. When two 70% solutions of different blown linseed oils (not identical to the oils used in Examples I, II, III and VI above) were treated with 0.043% of fluoboric acid as a 43% aqueous solution diluted with an equal amount of methoxy ethanol, one oil reached a viscosity of U–V in 21 hours, and the second reached a viscosity of U in six days. If the desired viscosity had been Z, the reaction rate might be too slow for efficient use of the process in which case methods of increasing the rate are disclosed in the above examples. On the other hand, in the first two hours, one of the blown oil solutions increased 7 letters in viscosity, and the second increased 5 letters; both results could well be satisfactory for certain application. A sample of blown soya oil treated under identical conditions reached a value of U in two hours and showed a gain of 5 letters in twenty minutes. Under some conditions of catalyst concentration, temperature and operating procedure, the reaction may proceed unduly rapidly. For example, when a sample of blown linseed having a viscosity of $Z_2$ to $Z_3$ is reduced to 70% solids in mineral spirits and treated with 1% of a 43% aqueous solution of fluoboric acid diluted with an equal amount of methoxy ethanol, the oil is gelled at room temperatures in eleven minutes. If the oil is not diluted, gelation occurs in two minutes; and if the organic solvent is not added to either the oil or the fluoboric acid, gelation occurs in 1 minute+50 seconds.

Since oils and fatty acids which have not been blown do not show any appreciable reactivity with fluoboric acid, a number of blown products were examined to determine whether a slight oxidation was sufficient to impart reactivity. In general, it has been found that a fatty material must be blown to show a substantial increase in viscosity before rapid polymerization is obtained with small amounts of the catalyst. For example, tung oil having an initial viscosity of J was blown with air until a viscosity of P was reached. Seven hundred grams of the blown oil diluted with 300 grams of mineral spirits gave a solution having a viscosity less than A. Addition of 2.1 grams of 43% aqueous fluoboric acid diluted with 6.3 grams of methoxy ethanol gave a body of A in 2.5 hours. After 5.5 hours, the body was still A. The experiment was conducted at 75° to 82° F. and involved the use of 0.3% of the 43% aqueous fluoboric acid based on the oil. When the same sample of blown tung oil at 90% solids in mineral spirits was treated with 0.3% of the aqueous catalyst diluted with three times as much methoxy ethanol, the oil solution went from an original viscosity of H to a viscosity of I in 5 hours. After one day the body was J, and after three days the body was K. The temperature ranged from 82° to 85° F. When the 90% solution of oil was treated with 0.5% of the catalyst diluted with three parts of methoxy ethanol, the viscosity reached a value of J in one day. The temperature varied from 68° to 80° F. These results should be compared with Example XI wherein 0.5% of aqueous fluoboric acid was used. In that example a temperature rise from 85° to 103° F. further illustrated the greater reactivity obtained with higher viscosity oil.

When linseed oil which had been blown from an initial viscosity of A to a final viscosity of L was treated with 1% of 43% aqueous fluoboric acid diluted with an equal amount of methoxy ethanol by weight and the mixture was heated to 170° F., a viscosity of N was reached after 25 minutes. Elsewhere in this specification it is shown that this amount of catalyst at room temperature will gel a linseed oil blown to a $Z_2$–$Z_3$ body. Consideration of the examples of this specification will show that great control can be exercised in the practice of the invention. The actual procedure followed to polymerize an oil will obviously depend on such factors as type of raw materials available, equipment, the nature of end product desired, etc. The intent here has not been to limit the practice to any established condition, but to disclose the effects of the various variables to serve as a guide in the selection of the conditions which one can employ for securing such particular end results as he may desire.

To neutralize or deactivate the catalyst, we can merely wash the oil or we can add an alkali such as potassium hydroxide directly to the oil mass. The alkali can be dissolved or dispersed in a solvent for convenience, but this is not necessary. The only function of the solvent is to provide rapid and intimate contact of the alkali with all parts of the oil. In general one should use an amount of alkali stoichiometrically equivalent to or in slight excess (5 to 10%) to the amount of catalyst. However, it has been found that if certain oils such as linseed which have been blown to a viscosity of less than about Z are treated with the catalyst, they polymerize in the normal fashion, but when alkali equivalent to the catalyst is added, the viscosity of the product decreases. This difficulty can be overcome since the reaction rate falls off with time, and if the catalyst concentration is selected so that the viscosity increases slowly in the vicinity of the desired value, then it is possible to effectively stop the process by adding less than the equivalent amount of alkali. In such cases, the addition of as little as 65% of the therotical amount of alkali can be made to yield a stable product. After the catalyst has been at least partially deactivated with alkali, the oil may be washed with water, if desired.

From what has been said above, it will be apparent that fluoboric acid is a very effective polymerization catalyst for blown unsaturated organic materials, even a few hundredths of one percent being effective. The catalyst is easy to introduce so as to give uniform concentrations in the batch, is conveniently stored as a liquid and avoids the difficulties incident to the handling of a gaseous catalyst such as boron trifluoride, all to the end of reducing the total costs of effecting the polymerization of blown materials. Moreover, the use of fluoboric acid is a distinct departure from the theoretical concepts inherent in the use of boron trifluoride. The latter is a recognized Friedel-Crafts catalyst whereas fluoboric acid is not. Accordingly, our discovery of the effectiveness of fluoboric acid solutions as polymerization catalysts provides catalysts possessing distinct advantages which are both unexpected and unobvious from what is known about boron trifluoride.

It will be understood that the process may be applied to any blown oils, blown oil-acids or their derivatives, or mixtures, so long as they have been blown sufficiently long to acquire the well-known characteristics of such treatment. Beyond that, the extent of blowing affects such characteristics as the rate at which the materials react in the presence of the catalysts of the invention, the extent of polymerization and compatibility or solvent tolerance. One skilled in the art can select an extent of blowing best suited to the treating conditions or end results which he desired.

Having now described our invention, what we claim is:

1. The process of treating material containing at least one unsaturated fatty acid radical which comprises: blowing the said material until oxygen has been added to said unsaturated radical; then treating said blown material with a small amount of aqueous fluoboric acid solution as catalyst at least until said blown material has been polymerized sufficiently to exhibit polymerization characteristics, said treatment with aqueous catalyst solution being effected at temperatures between about room temperature and about 250° F., and said aqueous catalyst solution being one in which the concentration of fluoboric acid is between about 4.8% and 70% by weight, and in which the aqueous remainder is selected from the group consisting of water and mixtures of water with water-miscible polar organic solvents; and thereafter at least partially deactivating the fluoboric acid of said catalyst solution.

2. The process as claimed in claim 1 wherein the material containing at least one unsaturated fatty acid radical is blown sufficiently to add oxygen in an amount equivalent to that which results by blowing tung oil until an increase in viscosity of six letters on the Gardner-Holdt scale has been secured.

3. The method as claimed in claim 2 wherein the material being treated consists of at least one oil of the vegetable drying and semi-drying oils.

4. The method as claimed in claim 2 wherein the material being treated consists of at least one fatty acid of drying and semi-drying vegetable oils.

5. The method as claimed in claim 2 wherein the material containing at least one unsaturated fatty acid radical is in an alkyd resin.

6. The process as claimed in claim 1 wherein the material containing at least one unsaturated fatty acid radical is blown sufficiently to add oxygen in an amount equivalent to that which results by blowing linseed oil until an increase in viscosity of eleven letters on the Gardner-Holdt scale has been secured.

7. The method as claimed in claim 6 wherein the material being treated consists of at least one oil of the vegetable drying and semi-drying oils.

8. The method as claimed in claim 6 wherein the material being treated consists of at least one fatty acid of vegetable drying and semi-drying oils.

9. The process which comprises: blowing glyceride oil selected from the class consisting of drying oils, semi-drying oils and mixtures thereof to add thereto at least an amount of oxygen approximately equivalent to that which results by blowing tung oil until an increase in viscosity of six letters on the Gardner-Holdt scale has been secured; then treating said blown oil with a small amount of aqueous fluoboric acid solution as catalyst at least until said blown oil has been polymerized sufficiently to exhibit polymerization characteristics, said treatment with catalyst being effected at temperatures between about room temperature and about 250° F., and said catalyst solution having a concentration of fluoboric acid therein of between about 4.8% and 70% by weight, with the remainder being selected from the group consisting of water and mixtures of water with water-miscible polar organic solvents; and thereafter deactivating the fluoboric acid of said catalyst solution to an extent of at least about 65%.

10. The process as claimed in claim 9, wherein said oil is treated with said catalyst in the presence of an organic solvent for the oil.

11. The process as claimed in claim 10 wherein the concentration of blown oil is about 70%.

12. The process as claimed in claim 9 wherein the glyceride oil is blown to a viscosity of at least about X on the Gardner-Holdt scale.

13. The process as claimed in claim 12 wherein the treatment of said blown oil with catalyst is carried out in the presence of an organic solvent for the oil.

14. The process as claimed in claim 13 wherein the concentration of blown oil is about 70%.

15. The process as claimed in claim 14 wherein the oil is linseed oil.

16. The process as claimed in claim 14 wherein the oil is soybean oil.

17. The process as claimed in claim 14 wherein the oil is a mixture of 75% linseed oil and 25% soybean oil.

18. The process which comprises providing a material selected from the group consisting of blown glyceride oils, blown mixtures of glyceride oils and mixtures of blown glyceride oils, said material having had oxygen added thereto by blowing in an amount approximately equivalent to that which results on blowing tung oil until its viscosity has been increased at least about 6 letters on the Gardner-Holdt scale; and treating said blown material with a small amount of aqueous fluoboric acid solution as catalyst at temperatures between about room temperature and 250° F. at least until said blown material has been polymerized sufficiently to exhibit polymerization characteristics, said catalyst solution being composed essentially of fluoboric acid in an amount of between about 4.8% and 70% by weight, with remainder selected from the group consisting of water and mixtures of water with water-miscible polar organic solvents; and thereafter deactivating the fluoboric acid of said catalyst solution to an extent of at least about 65%.

19. The process as claimed in claim 18 wherein the blown material has a viscosity of at least X on the Gardner-Holdt scale.

20. The process as claimed in claim 19 wherein the blown material is thinned with organic solvent prior to treatment with said fluoboric acid solution.

21. The process as claimed in claim 19 wherein the blown material is thinned with organic solvent to a glyceride oil concentration of about 70% before being treated with said fluoboric acid solution.

22. The process as claimed in claim 18 wherein the fluoboric acid of said catalyst solution is deactivated by washing the treated material with water.

References Cited in the file of this patent

UNITED STATES PATENTS

| | | |
|---|---|---|
| 2,196,670 | Eichwald | Apr. 9, 1940 |
| 2,381,481 | Anderson | Aug. 7, 1945 |
| 2,547,760 | Konen et al. | Apr. 3, 1951 |